United States Patent
Wu

(10) Patent No.: US 8,761,767 B2
(45) Date of Patent: Jun. 24, 2014

(54) METHOD, SYSTEM, TERMINAL AND NETWORK SIDE FOR TRIGGERING TERMINAL RESPONSE

(75) Inventor: Hao Wu, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 13/636,999

(22) PCT Filed: Nov. 18, 2011

(86) PCT No.: PCT/CN2011/082478
§ 371 (c)(1),
(2), (4) Date: Sep. 24, 2012

(87) PCT Pub. No.: WO2012/151916
PCT Pub. Date: Nov. 15, 2012

(65) Prior Publication Data
US 2013/0072188 A1 Mar. 21, 2013

(30) Foreign Application Priority Data
Jul. 20, 2011 (CN) .......................... 2011 1 0203999

(51) Int. Cl.
*H04W 60/04* (2009.01)
(52) U.S. Cl.
USPC .................... 455/435.1; 370/242; 709/223
(58) Field of Classification Search
CPC .... H04W 60/04; H04L 43/50; H04L 41/0213
USPC ......... 455/435.1; 370/242, 412, 338; 709/223
See application file for complete search history.

(56) References Cited

U.S. PATENT DOCUMENTS

2005/0249227 A1   11/2005   Wang et al.

2011/0310868 A1*  12/2011   Yang et al. ................... 370/338

FOREIGN PATENT DOCUMENTS

| CN | 101267431 A | 9/2008 |
| CN | 101562806 A | 10/2009 |
| CN | 101841780 A | 9/2010 |

OTHER PUBLICATIONS

3rdGeneration Partnership Project; Technical Specification Group Services and System Aspects; System Improvements for Machine-Type Communications; (Release 11), 3GPP TR 23.888 V1.3.0, Jun. 2011, 130 pages.

* cited by examiner

*Primary Examiner* — Phuoc H Doan
(74) *Attorney, Agent, or Firm* — Marger Johnson & McCollum, P.C.

(57) ABSTRACT

The present invention discloses a method for triggering terminal response, including: after receiving a trigger message sent by a network side, a terminal sending an access request message to the network side; wherein, the access request message includes a trigger identification. The present invention discloses a system for triggering terminal response which realizes the above-mentioned method for triggering terminal response, a terminal and a network side at the same time. In the present invention, when the network side receives the access request message sent by the terminal, because the access request message carries the trigger identification, the network side can determine which trigger message is responded by the access request message according to the trigger identification carried in the access request message, thus deleting this trigger message stored by itself after the terminal accesses the server, and does not need to send the trigger for the terminal repeatedly.

8 Claims, 2 Drawing Sheets

METHOD, SYSTEM, TERMINAL AND NETWORK SIDE FOR TRIGGERING TERMINAL RESPONSE

TECHNICAL FIELD

The present invention relates to the management technology of the machine type communication (MTC) terminal, and in particular, to a method, system, terminal and network side for triggering terminal response.

BACKGROUND OF THE RELATED ART

FIG. 1 is a structure diagram of the cellular wireless communication system. As shown in FIG. 1, the cellular wireless communication system is mainly composed of the Core Network (CN), the Radio Access Network (RAN) and the terminal. The core network is responsible for non-access layer affair, such as terminal location updating, etc., and the core network is the anchor point of the user plane at the same time. The access network includes a base station, or includes a base station and a base station controller, and the access network is responsible for the access layer affair, such as, the management of the radio resource, etc. There can be physical or logical connection between the base stations according to the actual condition, such as the connection between the base station 1 and the base station 2, the base station 1 and the base station 3 in FIG. 1, and each base station can connect with more than one nodes of the core network. The terminal, that is the user equipment (UE), refers to various devices that can communicate with the cellular wireless communication network, such as the mobile phone or notebook computer, etc.

The mobility management unit (Mobility Management Entity, MME) or the Serving GPRS Support Node (SGSN) is a unit responsible for managing the terminal access control, the location information updating and switching in the core network, which is responsible for the function of the non-access layer signaling control from the core network to the terminal and registering the terminal to the network.

The Home Subscriber Server (HSS) or the Home Location Register (HLR) is an entity responsible for storing the identity information, authentication information and authorization information, etc of the user equipment in the core network. According to different situations, the HSS or the HLR can be used for storing the user identity information and the binding information of the user and the user equipment, or only storing the user identity information (the binding information of the user and the user equipment can be stored by the gateway), or storing the identity information of the user equipment directly. The HSS or the HLR are also responsible for the signing database of the user, and performing the identity authentication and authorization of the user, etc. The service platform can inquire the user or user equipment information from the HSS or the HLR.

The Inter-Working Function entity (IWF) is a connection entity set between the mobile communication network and the outside public network, which can realize the function, such as, the protocol conversion, the address inquiry, the information storage etc. The Inter-Working Function entity connects to the application server externally, and can connect to the HSS/HLR or MME/SGSN internally.

Usually there are some services, for example, the monitoring management system needs to obtain the monitoring data from the monitor terminal, and needs to trigger the terminal to set up the connection with the server through the server to report the required data. Then after the terminal receives the trigger message from the server, it needs to be able to respond immediately and set up the connection with the server. And in the related art, when triggering the terminal, the network entity needs to store the trigger message sent by the server, and does not delete the stored trigger message of this terminal until the terminal responds to this trigger message and sets up the connection with the server. But the signaling of the terminal request message connecting to the network does not carry the indication whether it is to respond to the trigger message, in this way, the signaling of the terminal request message connecting to the network might also be triggered due to the existing of other services. If the network entity cannot receive the accurate instruction, it may send the trigger message to the terminal again, which causes that the terminal sends the signaling repeatedly and wastes the network resource.

CONTENT OF THE INVENTION

On that basis, the main objective of the present invention is to provide a method and a system for triggering terminal response, a terminal and a network side. The network side can determine which trigger message is responded by the access request message according to the trigger identification carried in the access request message, thus deleting the trigger message stored by itself after determining that the terminal accesses the server.

In order to achieve the above-mentioned objective, the technical scheme of the present invention is realized like this:
a method for triggering terminal response, comprising:
after receiving a trigger message sent by a network side, a terminal sending an access request message to the network side; wherein, the access request message includes a trigger identification.

Preferably, the method further comprises:
after receiving the access request message, the network side deleting the trigger message stored locally according to the trigger identification.

Preferably, the trigger identification is used for indicating whether the access request message is a message responding to the trigger message.

Preferably, when the access request messages received by the terminal in a preset time period are more than two, the trigger identification is further used for indicating a service type corresponding to the trigger message.

Preferably, the method further comprises:
after receiving the access request message, the network side deleting the corresponding trigger message stored locally according to the trigger identification and the service type.

Preferably, the access request message is an attachment request message, or a service request message, a packet data network connection request message, or a packet data protocol context establishment request message.

Preferably, the network sides is a mobility management entity (MME)/a serving GPRS support node (SGSN), or a home subscriber server (HSS)/a home location register (HLR), or an inter-working function entity (IWF).

A terminal, comprising a receiving unit and a sending unit, wherein, the receiving unit is used to receive a trigger message sent by a network side, and
the sending unit is used to send an access request message to the network side; wherein, the access request message includes a trigger identification.

Preferably, the trigger identification is used for indicating whether the access request message is a message responding to trigger message;

or, when the access request messages received by the receiving unit in a preset time period are more than two, the trigger identification is used for indicating whether the access request message is a message responding to the trigger message, and used for indicating a service type corresponding to the trigger message.

Preferably, the access request message is an attachment request message, or a service request message, a packet data network connection request message, or a packet data protocol context establishment request message.

A network side, comprising a sending unit, a receiving unit and a deleting unit, wherein, the sending unit is used to send a trigger message to a terminal;

the receiving unit is used to receive an access request message sent by the terminal; wherein, the access request message includes a trigger identification; and the deleting unit is used to delete the trigger message stored locally according to the trigger identification.

Preferably, the trigger identification is used for indicating whether the access request message is a message responding to the trigger message;

or, when the access request messages received by the receiving unit in a preset time period are more than two, the trigger identification is used for indicating whether the access request message is responding to the trigger message, and used for indicating a service type corresponding to the trigger message.

Preferably, when the trigger messages sent by the sending unit to the terminal in a preset time period are more than two, the receiving unit deletes the corresponding trigger message stored locally according to the trigger identification and the service type after receiving the access request message.

Preferably, the network sides is a mobility management entity (MME)/a serving GPRS support node (SGSN), or a home subscriber server (HSS)/a home location register (HLR), or an inter-working function entity (IWF).

A machine type communication system, comprising a terminal and a network side, wherein, the terminal comprises:

a receiving unit, used to receive a trigger message sent by the network side, and a sending unit, used to send an access request message to the network side; wherein, the access request message includes a trigger identification;

the network side comprises:

a sending unit, used to send a trigger message to the terminal;

a receiving unit, used to receive an access request message sent by the terminal; wherein, the access request message includes a trigger identification; and a deleting unit, used to delete the trigger message stored locally according to the trigger identification.

In the present invention, when the network side receives the access request message sent by the terminal, because the access request message carries the trigger identification, the network side can determine which trigger message is responded by the access request message according to the trigger identification carried in the access request message, thus deleting this trigger message stored by itself after the terminal accesses the server, and does not need to send the trigger for the terminal repeatedly, in this way, it can save the processing resource and storage space of the network side greatly. Specially, it is suitable for the management of the MTC terminals in a large quantity.

PREFERRED EMBODIMENTS OF THE PRESENT INVENTION

Figure 1:
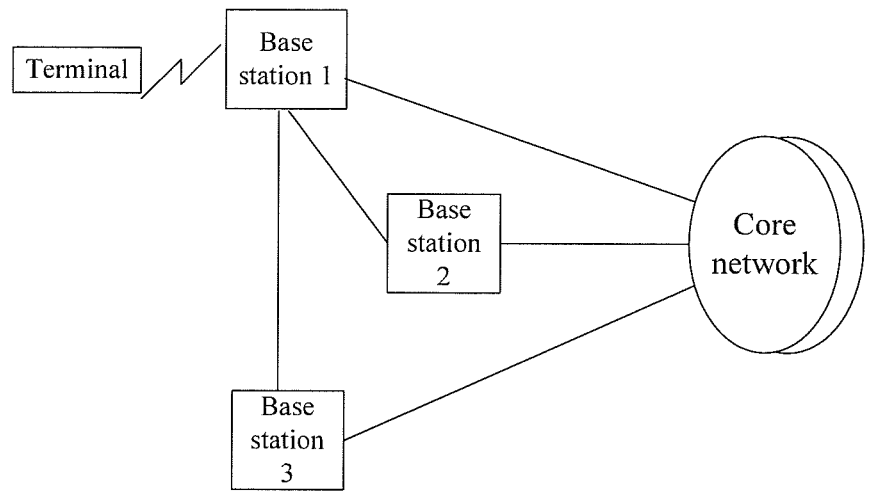
FIG. 1 is a structure diagram of a cellular wireless communication system.

The basic idea of the present invention is that: when the network side receives an access request message sent by the terminal, because the access request message carries a trigger identification, the network side can determine which trigger message it is that the access request message responds to according to the trigger identification carried in the access request message.

In order to make the objective, technical scheme and advantage of the present invention more clear and obvious, the present invention is described in detail with reference to the accompanying drawings and embodiments hereinafter.

Embodiment One

In step 1, when the MTC application server needs to obtain the real time data from the terminal, the trigger message is sent to the mobility management unit (MME/SGSN). The trigger message includes the information, such as, an identification of the terminal, the valid time of the trigger indication, the address of the server, etc.

In step 2, after the MME/SGSN receives the trigger message, the paging message is constructed according to the identification of the terminal in the trigger message to page the terminal;

the process of paging the terminal is that: the MME/SGSN constructs the paging message, where the paging message includes the trigger message of the terminal and the paging moment parameter, and sends the paging message to the base station; then the base station calculates the paging moment according to the paging moment parameter, and sends the paging message on the paging channel at the paging moment; in the terminal side, the paging moment parameter is pre-configured in the terminal, and the terminal station calculates the paging moment with the algorithmic method same as the base station, and reads the paging message on the paging channel at the paging moment.

In step 3, after receiving the paging message, the terminal reads the trigger message in the paging message, sends an attachment request message to the MME/SGSN, sets a Boolean type parameter in the attachment request message, where the parameter name here is "trigger identification", and sets the parameter value of the "trigger identification" as "TRUE".

Here, "TRUE" is an indication used for identifying the trigger message, not the attachment request message which is sent to respond to other services. In the present example, it is supposed that the trigger message received by the terminal in a preset time period is one, that is, other servers do not initiate the trigger message for the terminal at the same time in the preset time period.

In step 4, after receiving the attachment request message of the terminal, the MME/SGSN reads the "trigger identification" information in the attachment request message, if the value is set as "TRUE", it means that it is a response message to the trigger message, and then it deletes the trigger message of the terminal stored locally.

In step 5, if the terminal initiates the attachment request message not because of the trigger message, then the value of the parameter "trigger identification" is set as "FALSE" in the attachment request message.

Embodiment Two

In step 1, when needing to obtain the real time data from the terminal, the MTC application server sends the trigger message to the mobility management unit (MME/SGSN). The trigger message includes an identification of the terminal, the valid time of the triggering indication and the address of the server.

In step 2, after receiving the trigger message, the MME/SGSN the constructs a system message according to the identification of the terminal in the trigger message, and broadcast the system message on the broadcast channel;

the process of constructing the system message is that: the MME/SGSN sends the trigger message to the base station, the base station adds the trigger message into the current system message block or generates the new system message block, and then bears the system message block on the broadcast channel and sends it.

In step 3, the terminal reads the system message on the broadcast channel, reads the trigger message therein, and initiates a service request message to the MME/SGSN, and sets a Boolean type parameter in the service request message, and the parameter name here is "trigger identification", and the parameter value of the "trigger identification" is set as "TRUE".

In step 4, after receiving the service request message of the terminal, the MME/SGSN reads the "trigger identification" information in the service request message, if the value is set as "TRUE", then it deletes the trigger message of the terminal stored locally.

In step 5, if the terminal initiates the service request message not because of the trigger message, then the value of the parameter "trigger identification" is set as "FALSE" in service request message.

Embodiment Three

In step 1, when needing to obtain the real time data from the terminal, the MTC application server sends the trigger message to the mobility management unit (MME/SGSN). The trigger message includes an identification of the terminal, the valid time of the trigger indication and the address of the server.

In step 2, after receiving the trigger message, the MME/SGSN sends the trigger message to the terminal through the non-access layer (NAS) signaling;

the sending process through the NAS signaling is as follows:

the MME/SGSN contains the trigger message in the NAS signaling "DOWNLINK GENERIC NAS TRANSPORT", and sends the trigger message to the terminal;

In step 3, after receiving the "DOWNLINK GENERIC NAS TRANSPORT" signaling, the terminal reads the trigger message therein, and initiates a packet data network connection request message or a packet data protocol context establishment request message to the MME/SGSN, and sets a Boolean type parameter in the packet data network connection request message or the packet data protocol context establishment request message, and the parameter name here is "trigger identification", and the parameter value of the "trigger identification" is set as "TRUE".

In step 4, after receiving the packet data network connection request message or the packet data protocol context establishment request message of the terminal, the MME/SGSN reads the "trigger identification" information in the packet data network connection request message or the packet data protocol context establishment request message, if the value is set as "TRUE", then it deletes the trigger message of the terminal stored locally.

In step 5, if the terminal initiates the packet data network connection request message or the packet data protocol context establishment request message not because of the trigger message, then the value of the parameter "trigger identification" is set as "FALSE" in attachment request message.

Embodiment Four

This example is suitable for that, in a preset time period, the terminal receives more than two trigger messages. Here, the preset time period mainly refers to a general processing time length that the terminal receives the trigger message and responds the access request message of the terminal to the network side, and the time length can be configured by the network system operator according to the actual conditions, and will no longer give the specific means setting value here.

When the received trigger messages in the preset time period are more than two, the network side cannot determine which trigger message is responded by the access request message only according to whether the identification is the response to the trigger message, so, it needs to set the identification which can be used to distinguish different trigger messages, such as, the service identification or the trigger indication identification, etc., for the network side to distinguish and delete the corresponding access request message.

In step 1, when needing to obtain the real time data from the terminal, the MTC application server sends the trigger message to the mobility management unit (MME/SGSN). The trigger message includes an identification of the terminal, the service identification or trigger indication identification, the valid time of the trigger indication and the address of the server.

Here, the service identification or the trigger indication identification can identify the current trigger message uniquely, used for distinguishing the trigger messages from different servers by the terminal. Therefore, so long as it is the identification with the same function, it can be regarded as the substitute identification of the service identification or trigger indication identification described herein.

In step 2, after receiving the trigger message, the MME/SGSN sends the trigger message to the terminal through the non-access layer (NAS) signaling;

the sending process through the NAS signaling is as follows:

the MME/SGSN contains the trigger message in the NAS signaling "DOWNLINK GENERIC NAS TRANSPORT", and sends it to the terminal;

In step 3, after receiving the "DOWNLINK GENERIC NAS TRANSPORT" signaling, the terminal reads the trigger message therein, and initiates a packet data network connection request message or a packet data protocol context establishment request message to the MME/SGSN, and sets a Boolean type parameter in the packet data network connection request message or the packet data protocol context establishment request message, and the parameter name here is "trigger identification", and its structure is as follows:

trigger indications {
whether it is triggered, the Boolean type;
trigger identification, character type;
}, and the value of the "whether it is triggered" item in the "trigger indication" is set as "TRUE", and the value of the "trigger identification" item is set as the service identification or the trigger indication identification in the received trigger message.

In step 4, after receiving the packet data network connection request message or the packet data protocol context establishment request message of the terminal, the MME/SGSN reads the "trigger identification" information in the packet data network connection request message or the packet data protocol context establishment request message, if the value of the parameter "whether it is triggered" is "TRUE", then it deletes the service identification in the trigger message of the terminal stored locally and that trigger message matched with the "trigger identification" item in the identification.

In step 5, if the terminal initiates the packet data network connection request message or the packet data protocol context establishment request message not because of the trigger message, then the value of the "whether it is triggered" in the parameter "trigger identification" is set as "FALSE" and the "trigger identification" item is set as null in attachment request message.

Embodiment Five

In step 1, when needing to obtain the real time data from the terminal, the MTC application server sends the trigger message to the HSS or HLR or IWF, and the HSS or HLR or IWF stores the trigger message locally and sends the trigger message to the mobility management unit (MME/SGSN). The trigger message includes an identification of the terminal, the valid time of the trigger indication and the address of the server.

In step 2, after receiving the trigger message, the MME/SGSN sends the trigger message to the terminal through the non-access layer (NAS) signaling;

the sending process through the NAS signaling is as follows:

the MME/SGSN contains the trigger message in the NAS signaling "DOWNLINK GENERIC NAS TRANSPORT", and sends it to the terminal;

In step 3, after receiving the "DOWNLINK GENERIC NAS TRANSPORT" signaling, the terminal reads the trigger message therein, and initiates a packet data network connection request message or a packet data protocol context establishment request message to the MME/SGSN, and sets a Boolean type parameter in the packet data network connection request message or the packet data protocol context establishment request message, and the parameter name here is "trigger identification", and the parameter value of the "trigger identification" is set as "TRUE".

In step 4, after receiving the packet data network connection request message or the packet data protocol context establishment request message of the terminal, the MME/SGSN reads the "trigger identification" information in the packet data network connection request message or the packet data protocol context establishment request message, if the value is set as "TRUE", then it sends the trigger success message to the HSS or HLR or IWF, and the HSS or HLR or IWF deletes the responded trigger message locally.

In step 5, if the terminal initiates the packet data network connection request message or the packet data protocol context establishment request message not because of the trigger message, then the value of the parameter "trigger identification" is set as "FALSE" in attachment request message.

Figure 2:
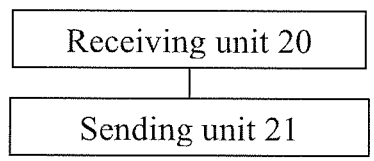
FIG. 2 is a composition structure diagram of a terminal according to an embodiment of the present invention.

FIG. 2 is a composition structure diagram of a terminal according to an embodiment of the present invention. As shown in FIG. 2, the terminal of the embodiment of the present invention includes a receiving unit 20 and a sending unit 21, wherein, the receiving unit 20 is used to receive a trigger message sent by a network side, and the sending unit 21 is used to send an access request message to the network side; wherein, the access request message comprises a trigger identification.

The above-mentioned trigger identification is used for indicating whether the access request message is the one responding to the trigger message;

or, when the access request message received by the receiving unit in a preset time period is more than two, the trigger identification is used for indicating whether the access request message is the one responding to the trigger message, and used for indicating a service type corresponding to the trigger message.

The above-mentioned access request message is an attachment request message, or a service request message, a packet data network connection request message, or a packet data protocol context establishment request message.

Figure 3:
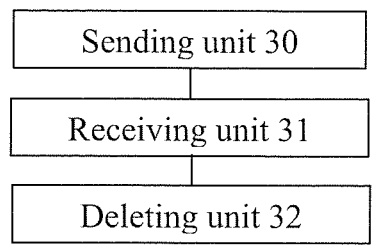
FIG. 3 is a composition structure diagram of a network side according to an embodiment of the present invention.

FIG. 3 is a composition structure diagram of a network side according to an embodiment of the present invention. As shown in FIG. 3, the network side of the embodiment of the present invention includes a sending unit 30, a receiving unit 31 and a deleting unit 32, wherein, the sending unit 30 is used to send a trigger message to a terminal;

the receiving unit 31 is used to receive an access request message sent by the terminal; wherein, the access request message includes a trigger identification; and the deleting unit 32 is used to delete the trigger message stored locally according to the trigger identification.

The above-mentioned trigger identification is used for indicating whether the access request message is the one responding to trigger message;

or, when the access request message received by the receiving unit in a preset time period is more than two, the trigger identification is used for indicating whether the access request message is the one responding to the trigger message, and used for indicating a service type corresponding to the trigger message.

Preferably, when the trigger message sent by the sending unit to the terminal in a preset time period is more than two, the receiving unit deletes the corresponding trigger message stored locally according to the trigger identification and the service type after receiving the access request message.

Preferably, the network sides is a mobility management entity (MME)/a serving GPRS support node (SGSN), or a home subscriber server (HSS)/a home location register (HLR), or an inter-working function entity (IWF).

The present invention further records a machine type communication system, including a terminal and a network side, wherein, the terminal includes:

a receiving unit, used to receive a trigger message sent by a network side, and a sending unit, configured to send an access request message to the network side; wherein, the access request message comprises a trigger identification.

the network side includes:

a sending unit, used to send a trigger message to the terminal;

a receiving unit, configured to receive an access request message sent by the terminal; wherein, the access request message includes a trigger identification; and a deleting unit, used to delete the trigger message stored locally according to the trigger identification.

The terminal and network side in the machine type communication system of the present invention are the terminal shown in FIG. 2 and the network side shown in FIG. 3 respectively.

Those skilled in the art should understand that the function of the processing unit involved in the above-mentioned terminal and the network side can be realized through a hardware circuit or through the processor performing the corresponding software. The function of each above-mentioned processing unit can be understood by combining the relevant description of the aforesaid identification distribution method in the wireless local area network of the present invention.

The above description is only the embodiments of the present invention and is not intended to limit the protection scope of the present invention.

What is claimed is:

1. A method for triggering terminal response, comprising:
    after receiving a trigger message at a terminal sent by a mobility management entity (MME), sending an access request message by the terminal to the MME; wherein, the trigger message is a message sent by the MME for triggering the terminal and implementing a communication service, the access request message includes a trigger identification, the trigger identification is used for indicating whether the access request message is a message responding to the trigger message; and
    after receiving the access request message by the MME, deleting by the MME the trigger message stored locally according to the trigger identification;
    wherein, when the trigger messages received by the terminal in a preset time period are more than two, the trigger identification is further used for indicating a service type corresponding to the trigger message.

2. The method according to claim 1, further comprising:
    after receiving the access request message, the MME deleting the corresponding trigger message stored locally according to the trigger identification and the service type.

3. The method according to claim 1, wherein, the access request message is an attachment request message, or a service request message, a packet data network connection request message, or a packet data protocol context establishment request message.

4. A terminal, comprising a receiving unit and a sending unit, wherein,
    the receiving unit is used to receive a trigger message sent by a mobility management entity (MME); and
    the sending unit is configured to send an access request message to the MME; wherein, the trigger message is a message sent by the MME for triggering the terminal and implementing a communication service, the access request message includes a trigger identification, the trigger identification is used for indicating whether the access request message is a message responding to trigger message;
    wherein, when the trigger messages received by the receiving unit in a preset time period are more than two, the trigger identification is used for indicating whether the access request message is a message responding to the trigger message, and used for indicating a service type corresponding to the trigger message.

5. The terminal according to claim 4, wherein, the access request message is an attachment request message, a service request message, a packet data network connection request message, or a packet data protocol context establishment request message.

6. The terminal according to claim 4, wherein, the access request message is an attachment request message, a service request message, a packet data network connection request message, or a packet data protocol context establishment request message.

7. A mobility management entity (MME), comprising a sending unit, a receiving unit and a deleting unit, wherein,
    the sending unit is used to send a trigger message to a terminal;
    the receiving unit is used to receive an access request message sent by the terminal; wherein, the trigger message is a message sent by the MME for triggering the terminal and implementing a communication service, the access request message includes a trigger identification, the trigger identification is used for indicating whether the access request message is a message responding to the trigger message; and
    the deleting unit is used to delete the trigger message stored locally according to the trigger identification;
    wherein, when the access request messages received by the receiving unit in a preset time period are more than two, the trigger identification is used for indicating whether the access request message is responding to the trigger message, and used for indicating a service type corresponding to the trigger message.

8. The MME according to claim 7, wherein,
    when the trigger messages sent by the sending unit to the terminal in a preset time period are more than two, the receiving unit deletes the corresponding trigger message stored locally according to the trigger identification and the service type after receiving the access request message.

* * * * *